(12) United States Patent
Goldsack et al.

(10) Patent No.: US 10,192,066 B2
(45) Date of Patent: Jan. 29, 2019

(54) SEMANTIC RESTRICTION (71) Applicant: HEWLETT PACKARD ENTERPRISE DEVELOPMENT LP, Houston, TX (US)

(72) Inventors: Patrick Goldsack, Bristol (GB); Marco Casassa Mont, Bristol (GB); Suksant Sae Lor, Bristol (GB); Simon Kai-Ying Shiu, Bristol (GB)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 133 days.

(21) Appl. No.: 15/125,675

(22) PCT Filed: Mar. 14, 2014

(86) PCT No.: PCT/US2014/029030
§ 371 (c)(1),
(2) Date: Sep. 13, 2016

(87) PCT Pub. No.: WO2015/137978
PCT Pub. Date: Sep. 17, 2015

(65) Prior Publication Data
US 2017/0004319 A1     Jan. 5, 2017

(51) Int. Cl.
*G06F 21/00* (2013.01)
*G06F 21/62* (2013.01)
*G06F 21/57* (2013.01)

(52) U.S. Cl.
CPC ........ *G06F 21/6218* (2013.01); *G06F 21/577* (2013.01); *G06F 2221/034* (2013.01); *G06F 2221/2149* (2013.01)

(58) Field of Classification Search
CPC ........................... G06F 21/6218; G06F 21/577
(Continued)

(56) References Cited

U.S. PATENT DOCUMENTS 5,761,477 A    6/1998    Wahbe et al.
6,356,941 B1    3/2002    Cohen
(Continued)

FOREIGN PATENT DOCUMENTS

CN    101582894 A    11/2009
CN    102972005 A    3/2013
(Continued)

OTHER PUBLICATIONS

Fred Kuhns, "OS Function," Mar. 21, 2013, pp. 1-15, Washington University in St. Louis, MO, USA, CSE522, Available at: <powershow.com/view/3c61d0NTliO/OS_Function_powerpoint_ppt_presentation>.
(Continued)

*Primary Examiner* — Anthony D Brown
(74) *Attorney, Agent, or Firm* — Hewlett Packard Enterprise Patent Department (57) ABSTRACT

In one implementation, a data sharing system can comprise a trust engine to identify an environment that satisfies a level of trust, an access engine to request access to a set of data, a procedure engine to receive a procedure, a restriction engine to receive a semantic restriction associated with a semantic term of the environment, a tracker engine to track the procedure during execution, and a control engine to maintain execution of the procedure based on the restriction and trace information. In another implementation, a method for sharing a set of data can comprise validating an environment satisfies a level of trust, receiving a procedure to access the set of data, receiving a semantic restriction associated with a semantic term of the environment, tracing the procedure during execution, and providing a view of the set of data based on the restriction and a semantic mapping of trace information.

20 Claims, 5 Drawing Sheets

(58) Field of Classification Search
USPC .......................................................... 726/16
See application file for complete search history.

(56) References Cited

U.S. PATENT DOCUMENTS

| | | | |
|---|---|---|---|
| 6,546,546 | B1 | 4/2003 | Van Doom |
| 7,376,974 | B2 | 5/2008 | Proudler et al. |
| 7,475,431 | B2 | 1/2009 | Chao |
| 8,468,244 | B2 | 6/2013 | Redlich et al. |
| 8,510,859 | B2 | 8/2013 | Zimmer et al. |
| 2004/0001218 | A1* | 1/2004 | Christiansen ......... G06F 3/1204 358/1.15 |
| 2007/0204166 | A1 | 8/2007 | Tome et al. |
| 2009/0216859 | A1 | 8/2009 | Dolling |
| 2009/0228950 | A1 | 9/2009 | Reed et al. |
| 2010/0115514 | A1 | 5/2010 | Maliszewski |
| 2010/0199104 | A1 | 8/2010 | Van Rijnswou |
| 2010/0284304 | A1 | 11/2010 | Mao et al. |
| 2010/0299313 | A1 | 11/2010 | Orsini et al. |
| 2011/0321134 | A1 | 12/2011 | Kotani |
| 2012/0042395 | A1 | 2/2012 | Jain et al. |
| 2012/0144040 | A1 | 6/2012 | Hacigumus et al. |
| 2012/0191716 | A1 | 7/2012 | Omoigui |
| 2012/0256914 | A1* | 10/2012 | Chevochot .......... G06F 17/5004 345/419 |
| 2013/0055335 | A1 | 2/2013 | Chien |
| 2013/0097625 | A1 | 4/2013 | Thorwirth et al. |
| 2013/0312116 | A1 | 11/2013 | Park |
| 2014/0006609 | A1 | 1/2014 | Gay et al. |

FOREIGN PATENT DOCUMENTS

| | | |
|---|---|---|
| CN | 103069429 A | 4/2013 |
| TW | I224919 B | 12/2004 |
| TW | 201337626 A | 9/2013 |

OTHER PUBLICATIONS

International Search Report and Written Opinion, International Application No. PCT/US2014/029030, dated Nov. 28, 2014, pp. 1-8, KIPO.

Office Action, TW Application No. 104108087, dated Feb. 26, 2016, pp. 1-9, TWPAT.

Amal Alsubaih and Alaaeldin Hafez, "Privacy Preserving Model in Semi-Trusted Cloud Environment," Proceedings of the International Conference on Cloud Computing and eGovernance, Jul. 25, 2013, pp. 24-28.

International Search Report and Written Opinion, International Application No. PCT/US2014/028697, dated Dec. 8, 2014, pp. 1-8, KIPO.

M.R. Asghar et al., "ESPOON: Enforcing Encrypted Security Policies in Outsourced Environments," 2011 Sixth International Conference on Availability, Reliability and Security, Aug. 22-26, 2011, pp. 99-108, IEEE.

Munawar Hafiz, "Security Patterns and Secure Software Architecture," OOPSLA Tutorial 51, Oct. 26, 2006, pp. 1-100, ACM.

Office Action, TW Application No. 104108086, dated May 11, 2016, pp. 1-8, TIPO.

* cited by examiner

SEMANTIC RESTRICTION

BACKGROUND

Data can be shared among entities. For example, data sharing can be performed between a first entity that provides access to a set of data for a second entity to view. Access to data can be controlled using access control parameters, such as access control lists ("ACL") of who may access the data. Based on access control parameters of a sharer (e.g. an entity providing the data to be accessed), an authorized sharee (e.g. an entity requesting access to the data) can access a data view (e.g. a transformation of the data for viewing, access, and/or use). Various views of the data can be provided to the sharee. For example, the sharee can be allowed to access all or part of the data view.

DETAILED DESCRIPTION

In the following description and figures, some example implementations of data sharing systems and/or methods for sharing a set of data are described. Data sharing can take place among many entities, such as data communities, and/or directly between two entities. In an environment where multiple entities share data, the data can be located in the possession of one entity or distributed across multiple entities, such as in a cloud environment. In general, an entity may desire to limit access to the data being held. For example, parts of the data can be confidential or otherwise limited for view and/or use based on legal compliance. As used herein, the term "access" refers to any interaction with data. The sharer (e.g. the owner of the data to be shared or an entity in charge of the data) can utilize access controls to attempt to restrict access to a data view of the data by the sharee. Once the data view is accessed by the sharee, however, the sharee can choose to use the data view without further control from the sharer as to how the data view is used. Access to data can depend on what is to be done with the data, and what other data has been accessed, and in turn restrict access to other data in the future. A sharee may attempt to request more data than permitted by the sharer or otherwise attempt to modify the transaction to obtain data to which the sharer did not intend for access by the sharee. Tracing data through memory can fail due to the low-level nature of the interface to memory and lack of ability to track high-level operations on data.

Various examples described below relate to sharing data based on a semantic restriction associated with a procedure performing the data share transaction. For example, the sharer can limit access to data by setting a semantic restriction in a high-level (e.g. human readable) language on the procedure requesting access to the data in an environment that is definable. As used herein, the term "restriction" is used to define a limit on access to data and a "semantic restriction" is a limitation on a meaning of the access to data. By utilizing an environment defined with a semantic restriction, a sharee can be limited in access to data in a high level manner and allow complex restrictions on access to data based on definable semantics.

Figure 1:
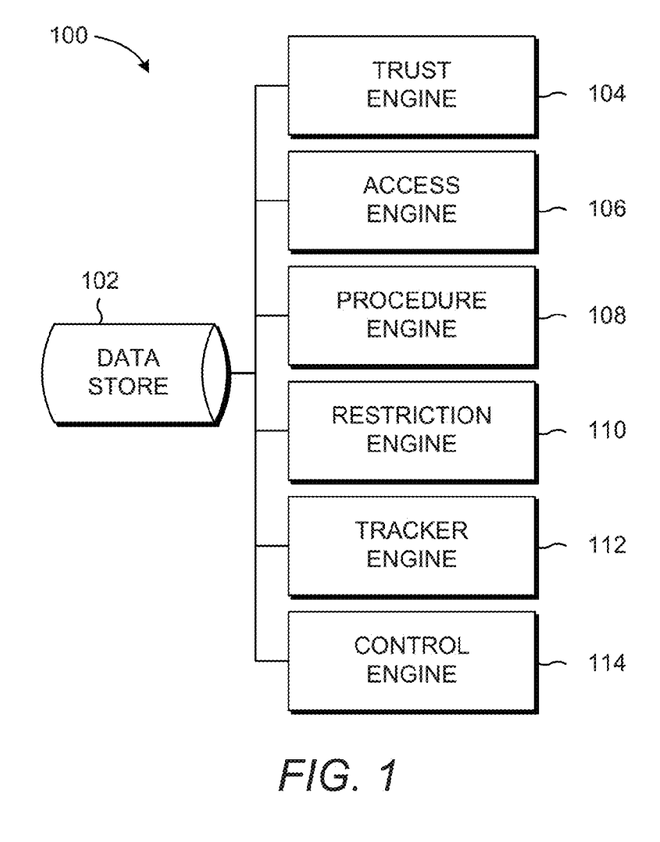
FIGS. 1 and 2 are block diagrams depicting example data sharing systems.
Figure 2:
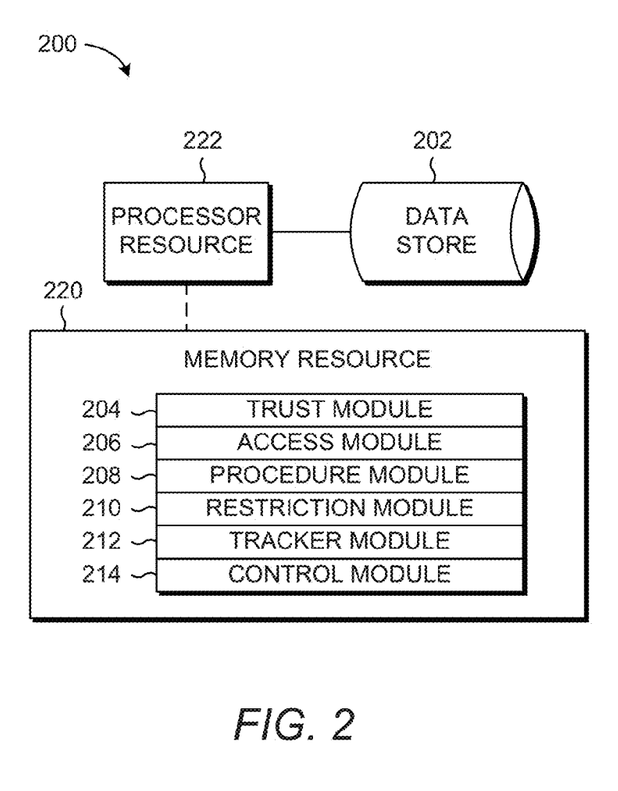

FIGS. 1 and 2 are block diagrams depicting example data sharing systems. Referring to FIG. 1, an example data sharing system 100 generally comprises a trust engine 104, an access engine 106, a procedure engine 108, a restriction engine 110, a tracker engine 112, and a control engine 114. In general, the system 100 utilizes the engines 104, 106, 108, 110, 112, and 114 to restrict a procedure for accessing a set of data in a trusted environment based on a semantic restriction of the trusted environment. The system 100 can include a data store 102 for storing the data used and/or produced by the engines of the system 100. The terms "include," "have," and variation thereof, as used herein, mean the same as the term "comprise" or appropriate variation thereof. Furthermore, the term "based on," as used herein, means "based at least in part on." Thus, a feature that is described as based on some stimulus can be based only on the stimulus or a combination of stimuli including the stimulus.

The trust engine 104 represents any combination of circuitry and executable instructions to identify a level of trust of an environment in relation to an entity. For example, a sharer may require a certain level of encryption of the data to trust the environment in which the data will be accessed. The trust engine 104 can identify an environment that satisfies a trust level where the trust level represents an amount of trust of an entity for participation in a compute transaction. A compute transaction is any appropriate electronic communication to compute a result based on access to data or otherwise involves sharing data, such as exchanging data among entities or processing a procedure to access data. "Identifying a level of trust of an environment" can include recognizing, establishing, determining, validating, verifying, providing, or otherwise ascertaining the trust level of the environment. The trust engine 104 can identify an environment based on multiple levels of trust, which can be based on multiple entities. For example, the trust engine 104 can validate that an environment satisfies a first level of trust of a first entity and a second level of trust of a second entity. The trust engine 104 can allow for a first entity (such as the owner of the data or a third party) to apply trust controls on a second entity. Any number of entities can participate in the transaction and may have a trust level to apply on the environment. For example, a first entity can own the data, a second entity can provide a procedure, a third entity can provide a restriction on the transaction, and a fourth entity can receive the result of the procedure, such as a data view.

The environment can include at least one of the first entity and the second entity. For example, the sharer, the sharee, or a combination thereof can be within the trusted environment. The environment can be trusted when the entity is associated with the environment. For example, the sharer may automatically trust the environment in which it exists. The entities can exist in separate or integrated compute environments. For example, the set of data can reside in a first compute environment with a first entity and the trusted environment can be a second compute environment where a second entity stores a procedure to receive a view of the set of data owned by the first entity. For another example, the trusted environment can include at least one of the first compute environment and the second compute environment. For yet another example, the trusted environment can be separate from a first compute environment of a first entity and a second compute environment of a second entity. A compute environment, as used herein, is any appropriate combination of circuitry and executable instructions to process a procedure, exchange electronic information, and otherwise support execution of a procedure associated with sharing data. Example compute environments include a computer, a cloud, a cluster of hosts, and a network of compute devices. A compute environment can include a resource or combination of resources that can be physical (such as a central processing unit ("CPU"), memory, and external devices) or virtual (such as files, network connections, and virtual instances of physical resources).

A transaction among entities can take place in an environment that is sufficiently trusted by each entity of the transaction. For example, a transaction can take place when the sharer trusts the data will be secure in the environment and the sharee can trust the procedure to access the data will not be accessible to the sharer.

The access engine 106 represents any combination of circuitry and executable instructions to request access to a set of data. For example, the access engine can request access to a set of data owned or otherwise associated with a first entity. The access engine 106 can be utilized by the trusted environment to access the set of data in a way trusted by the first entity. For example, the access engine 106 can utilize a level of encryption set by the owner of the data. Thus, a procedure to access the set of data can use the access engine 106 to access the data to ensure the transaction is secure rather than allowing the sharee to have direct access to the raw data. For example, a procedure's query to access data can be intercepted to use the access engine 106 so that the query is constructed programmatically and, thereby, cannot be statically analyzed. The access engine 106 can work in conjunction with the other engines 108, 110, 112, and 114 to provide an appropriate data view based on a restriction, as discussed herein.

The procedure engine 108 represents any combination of circuitry and executable instructions to receive a procedure and execute the procedure. For example, the procedure engine 108 can receive a procedure from a second entity that requests access to the set of data of a first entity. A procedure is any appropriate function that requests access to data. For example, a procedure of a second entity can request to return billing information of a set of customers, where the billing information is held by a first entity that has a trust level to obfuscate credit card information. The procedure engine 108 can execute the procedure based on a security protocol of the trusted environment. For example, the procedure engine 108 can ensure execution of the procedure in a manner isolated from the owner of the set of data. The procedure engine 108 can receive a procedure to request access to a set of data. The procedure engine 108 can modify the procedure to comply with a security protocol of the trusted environment based on the trust level of the entity supplying the procedure. For example, a second entity can supply the procedure when the second entity trusts that the procedure will not be available to the first entity that owns the data to be accessed. The procedure engine 108 can execute the procedure in the trusted environment when the procedure complies with the security protocol of the trusted environment.

The environment can be defined in a language or otherwise provide the ability to compile a procedure associated with terms associated with a security control. For example, the environment can provide an instruction set that operates based on a semantic term and the environment compiles the procedure based on the instruction set. In that example, the semantic term can be associated with a restriction (as discussed further herein), such as a security protocol for execution of the procedure.

The restriction engine 110 represents any combination of circuitry and executable instructions to receive a restriction associated with execution of the procedure in the environment. A restriction can be any appropriate limitation on execution of the procedure and/or access to the data requested by the procedure. For example, the restriction can be a linguistic construct (in the language understandable by the trusted environment) to provide a constraint or other specification on a resource of the trusted environment, such as a logical expression to specify a maximum of data access. In this way, the restriction is on the code of the procedure to access the data rather than the data itself. For example, the code to access a database is limited in the trusted environment in addition to security limitations from the database. A restriction can be provided to an environment as logical expression via a data structure and/or an application programming interface ("API").

The restriction received by the restriction engine 110 is mapable to a semantic term associated with the definitions of the environment. For example, the trusted environment can be a virtual machine defined with semantic terms associated with security protocols to which the procedure can adhere. For another example, the restriction can map code to access credit card data with an obfuscation function, such as a cryptographic hash. The environment can be defined in a language that can interpret instructions according to a security protocol. For example, the semantic term for the restriction can identify an instruction to instrument or otherwise add to the code of the procedure to ensure the restriction is complied with. For another example, the trusted environment can compile the code of the procedure with a secure instruction set associated with the trust level as defined by a semantic mapping between a semantic term and a function of the procedure. The restriction can map to one of a data structure, a data flow, and a communication pattern. For example, the restriction to obfuscate credit card information can map to a data structure to contain credit card information, a data flow associated with access to a database of credit card information, or a communication pattern such as a set of sales transactions. For another example, the restriction can be mapped to a domain name system ("DNS") record to obfuscate an IP address in a DNS record data structure or as a DNS record is retrieved or otherwise communicated. The definable environment can classify an instruction of the procedure received by the procedure engine 108 based on a semantic mapping. For example, the environment can be defined to identify an instruction of code to execute in the environment and apply a semantic term to the identified instruction. The environment can be defined by an entity via an API. For example, a user of the procedure to access the data can provide a semantic mapping to define the environment to execute the procedure. For another example, the owner of the data can provide an instruction set based on a semantic mapping to define the environment. The mappings of the procedure and the restriction can be correlated to maintain execution of the procedure in the environment by the control engine 114 as described herein. Example of semantic terms of the language that can be translated and/or compiled to security protocols include a limitation on viewing or encoding a field, a rejection of a function type (such as concatenation functions), a limitation on computations to only averages, and the like.

The restriction engine 110 can receive a restriction associated with the environment from an entity and/or an environment. For example, the restriction engine 110 can receive a restriction from the owner of the data or a third party overseeing the transaction. A restriction can limit the total information that can be accessed, the sophistication of any encodings used, and/or the total information returned to the sharee. The restriction and the procedure can be correlated among a plurality of entities.

The restriction can apply to at least one of an entity (e.g. a sharee), a time period, and an execution session. For example, the scope of the restriction can be at least one of per analytic computation, on a number of computations, and over a period of time. The restriction can be received from any entity of the transaction or a third party to the transaction, such as a third party hosting the trusted environment. For example, a first entity can place a restriction on a second entity regardless of whether the first entity is the owner of the data. For another example, a third party host can place limit on the types of transactions or types of data between a first entity managing the data and a second entity supplying the procedure.

The tracker engine 112 represents any combination of circuitry and executable instructions to track the procedure during execution. For example, the tracker engine 112 can produce trace information associated with execution of the procedure. The trace information produced by the tracker engine 112 can be in the language defined by the environment or otherwise associated with a semantic mapping to the definitions of the environment. Trace information can include meta data of the procedure and the environment, such as function calls, resource utilization, and analysis thereof. For example, a sharer may allow a procedure to carry out statistical averaging of a set of data, but restrict encoding the data directly into the procedure by tracing a function invoked on the set of data (including tracing the resulting functions). In that example, an attempt to create a copy of data can be traced and disallowed based on the restriction unless the request is in accordance with the security protocols to ensure data is not encoded.

The tracker engine 112 can identify points of the execution of the procedure to trace based on the definitions of the environment. For example, the environment can execute the procedure in a language having a control point and the tracker engine can retrieve trace information at the control point. A control point can include any entry or exit of a function, a point of access to data, and an API call to a service. For example, a control point can be the entry and exit of the procedure received by trusted environment to access data. For another example, the procedure can be intercepted at every point of query to the shared data by placing code in the execution path to modify the query and/or result. The tracker engine 112 can assist a validity determination of computations that adhere to a restriction for security and data protection. For example, the tracker engine 112 can track data through computations and, in conjunction with the control engine 114, ensure that any results of an analytic computation adheres to restrictions given to the definable machine by the sharer of that data.

The control engine 114 represents any combination of circuitry and executable instructions to maintain execution of the procedure based on the restriction and the trace information. For example, when a semantic term associated with the restriction is satisfied by a semantic mapping associated with the trace information, the control engine 114 can terminate or otherwise limit the procedure from continuing to access the data via the access engine 106. The control engine 114 can return a result, such as a data view, based on the execution of procedure and the restriction. The control engine 114 can modify execution or otherwise maintain the procedure when the procedure satisfies the semantic restriction (e.g. the trace information is mapped to the semantic term of the restriction) and the result of the controlled procedure can be a partial result based on an expected result of the procedure (e.g. if the procedure was to complete execution without the limitation set by the control engine 114). For example, the tracker engine 112 can set a flag or otherwise message the control engine 114 to spawn a child process to execute the procedure in a controlled way (e.g. based on a security protocol) and return a partial view of the data (based on data that was available during the procedure until the flag was set) or restrict the data view based on semantic mapping. Examples of maintaining execution of the procedure include, limiting the view of the data to be returned, spawning a process (e.g. forking a child process) based on the restriction and the semantic term, and terminating execution of the procedure when the trace information satisfies the restriction.

The environment can be defined to provide semantic mappings of a programming language that are sufficiently constrained and/or limited that it is reasonable to track data based on the semantic mappings. For example, a language for defining the environment can include workflow structures, dataflow structures, or functional languages with security classifications of attributes to allow for data processing based on controls to handle the semantic mapping of the security classifications during a flow of the data and/or procedure. The environment can be provided by an entity, such as the data owner. The environment can include the engines 104, 106, 108, 110, 112 and 114. For example, the environment can be a virtual machine comprising a tracker engine 112 to trace a procedure of the environment and the environment can raise alerts in the execution of the procedure (or a separate process) to identify trace information that satisfies a restriction.

FIG. 2 depicts the example data sharing system 200 can be implemented on a memory resource 220 operatively coupled to a processor resource 222. The processor resource 222 can be operatively coupled to a data store 202. The data store 202 can be the same as data store 102 of FIG. 1.

Referring to FIG. 2, the memory resource 220 can contain a set of instructions that are executable by the processor resource 222. The set of instructions can implement the system 200 when executed by the processor resource 222. The set of instructions stored on the memory resource 220 can be represented as a trust module 204, an access module 206, a procedure module 208, a restriction module 210, a tracker module 212, and a control module 214. The processor resource 222 can carry out a set of instructions to execute the modules 204, 206, 208, 210, 212 and 214, and/or any other appropriate operations among and/or associated with the modules of the system 200. For example, the processor resource 222 can carry out a set of instructions to identify an environment that satisfies a trust level, receive a procedure to request access to a set of data, receive a restriction associated with execution of the procedure in the environment, compile the procedure based on an instruction set capable of semantically mapping the restriction to the procedure, execute the procedure in the environment, map a set of trace information of the procedure to a semantic term, and provide a result of the procedure based on the restriction and the semantic term. The trust module 204, the access module 206, the procedure module 208, the restriction module 210, the tracker module 212, and the control module 214 represent program instructions that when executed function as the trust engine 104, the access engine 106, the procedure engine 108, the restriction engine 110, the tracker engine 112, and the control engine 114 of FIG. 1, respectively.

The processor resource 222 can be one or multiple central processing units ("CPU") capable of retrieving instructions from the memory resource 220 and executing those instructions. Such multiple CPUs can be integrated in a single device or distributed across devices. The processor resource 222 can process the instructions, serially, concurrently, or in partial concurrence, unless described otherwise herein.

The memory resource 220 and the data store 202 represent a medium to store data utilized and/or produced by the system 200. The medium can be any non-transitory medium or combination of non-transitory mediums able to electronically store data, such as modules of the system 200 and/or data used by the system 200. For example, the medium can be a storage medium, which is distinct from a transitory transmission medium, such as a signal. The medium can be machine readable, such as computer readable. The memory resource 220 can be said to store program instructions that when executed by the processor resource 222 implements the system 200 of FIG. 2. The memory resource 220 can be integrated in the same device as the processor resource 222 or it can be separate but accessible to that device and the processor resource 222. The memory resource 220 can be distributed across devices. The memory resource 220 and the data store 202 can represent the same physical medium or separate physical mediums. The data of the data store 202 can include representations of data and/or information mentioned herein, such as a trust level, a data view, procedure code, a restriction, a semantic term, and context information, as discussed in the description of FIG. 3.

In the discussion herein, the engines 104, 106, 108, 110, 112, and 114 of FIG. 1 and the modules 204, 206, 208, 210, 212 and 214 of FIG. 2 have been described as a combination of circuitry and executable instructions. Such components can be implemented in a number of fashions. Looking at FIG. 2, the executable instructions can be processor executable instructions, such as program instructions, stored on the memory resource 220, which is a tangible, non-transitory computer readable storage medium, and the circuitry can be electronic circuitry, such as processor resource 222, for executing those instructions.

In one example, the executable instructions can be part of an installation package that when installed can be executed by processor resource 222 to implement the system 200. In that example, the memory resource 220 can be a portable medium such as a compact disc, a digital video disc, a flash drive, or memory maintained by a computer device, such as service device 334 of FIG. 3, from which the installation package can be downloaded and installed. In another example, the executable instructions can be part of an application or applications already installed. The memory resource 220 can include integrated memory such as a hard drive, a solid state drive, random access memory ("RAM"), read only memory ("ROM"), electrically erasable programmable ROM ("EEPROM"), flash memory, or the like.

Figure 3:
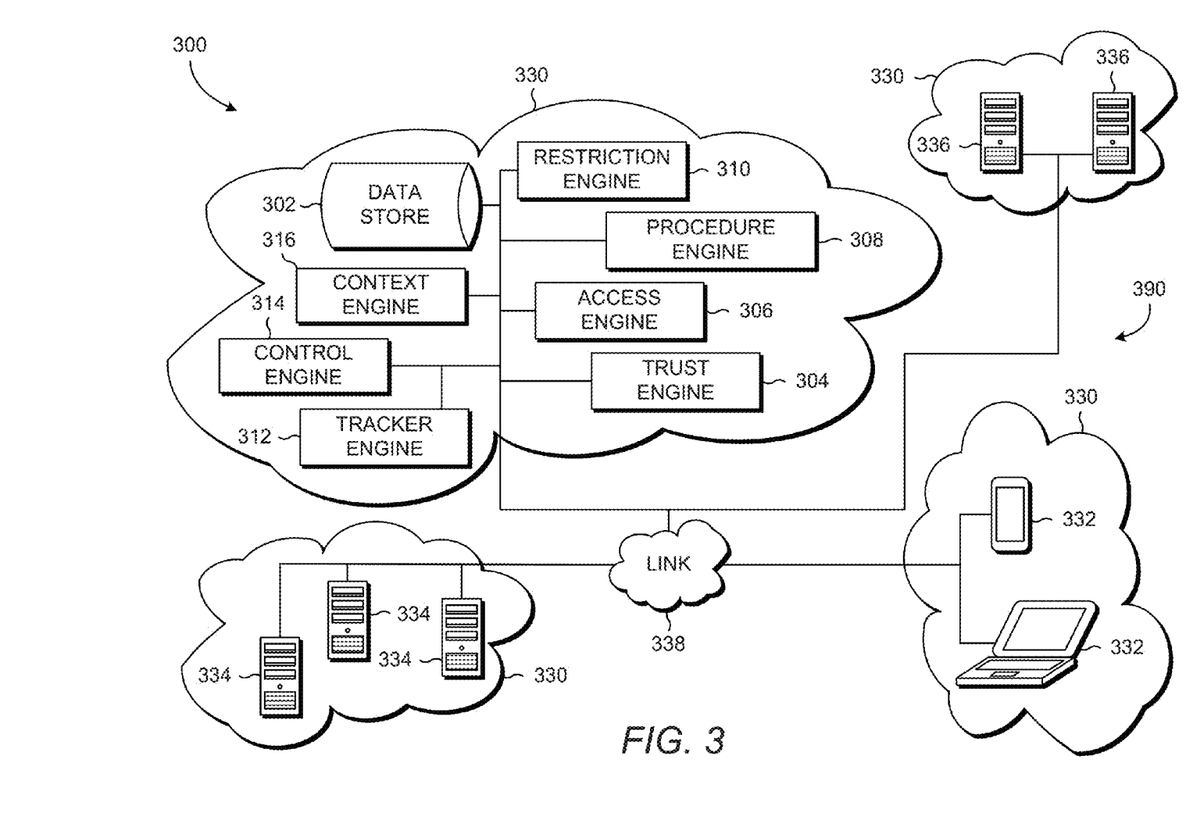
FIG. 3 depicts example environments in which various example data sharing systems can be implemented.

FIG. 3 depicts example environments in which various example data sharing systems can be implemented. The example environment 390 is shown to include an example system 300 for sharing data. The system 300 (described herein with respect to FIGS. 1 and 2) can represent generally any combination of circuitry and executable instructions to share data. The system 300 can include a data store 302, a trust engine 304, an access engine 306, a procedure engine 308, a restriction engine 310, a tracker engine 312, and a control engine 314 that are the same as the data store 102, the trust engine 104, the access engine 106, the procedure engine 108, the restriction engine 110, the tracker engine 112, and the control engine 114 of FIG. 1, respectively, and the associated descriptions are not repeated for brevity.

The system 300 can include a context engine 316. The context engine 316 represents any combination of circuitry and executable instructions to maintain a context of the environment associated with the procedure. The context is any appropriate combination of information related to the state of the environment and/or machine executing the environment, state of the data, state of the procedure, and/or the order of execution of the procedure within a group of procedures, such as a workload. For example, the context can include state information of a mechanism executing the procedure within a session of procedures. For another example, the context can include a semantic identifier of the environment associated with the execution of the procedure. The context engine 316 can maintain the context associated with the environment and the procedure. The context can comprise the semantic meaning (e.g. a group of semantic terms) associated with a scope of the restriction associated with execution, such as a session including the procedure. The context engine 316 can generally track the context of the trusted environment to ensure the restrictions are applied correctly. For example, if a field is set to be encrypted at a security level below the minimum in a previous procedure, the context engine 316 can inform the system 300 that the encryption level is compromised for any procedures dependent on the previous procedure. For another example, the system 300 can determine not to execute any other procedures for the scope of the restriction (e.g. session or time period) based on the context and the restriction. The data store 302 can store the context for use in determining whether the restriction applies to an executing procedure.

The example environment 390 can include compute devices, such as user devices 332 and service devices 334 and 336. For example, user device 332 can provide a procedure to access data of service devices 334 by executing the procedure in a trusted environment hosted by service devices 336. The compute devices can be located on separate networks 330 or part of the same network 330. The example environment 390 can include any appropriate number of networks 330. The example system 300 can be integrated into a compute device. The system 300 can be distributed across compute devices or a combination of compute devices. The environment 390 can include a cloud computing environment. For example, networks 330 can be distributed networks comprising virtual computing resources or "clouds." Any appropriate combination of the system 300 and compute devices can be a virtual instance of a virtual shared pool of resources. The engines and/or modules of the system 300 herein can reside and/or execute "on the cloud" (e.g. reside and/or execute on a virtual shared pool of resources).

The service devices 334 and 336 represent generally any computing devices configured to respond to a network request received from a user device 332, whether virtual or real. For example, networks 330 can be cloud computing environments executing a SaaS model of resources available as service devices 334. For another example, a service device 334 can be a virtual machine of the network 330 providing a service and the user device 332 can be a compute device configured to access the network 330 and receive and/or communicate with the service. The user devices 332 represent generally any compute device configured with a browser or other application to communicate a network request and receive and/or process the corresponding responses.

A link 338 represents generally one or any combination of a cable, wireless connection, fiber optic connection, or remote connections via a telecommunications link, an infrared link, a radio frequency link, or any other connectors of systems that provide electronic communication. The link 338 can include, at least in part, intranet, the Internet, or a combination of both. The link 338 can also include intermediate proxies, routers, switches, load balancers, and the like.

Referring to FIGS. 1-3, the engines 104, 106, 108, 110, 112, and 114 of FIG. 1, and/or the modules of 204, 206, 208, 210, 212, and 214 of FIG. 2 can be distributed across devices 332, 334, 336, or a combination thereof. The engines and/or modules can complete or assist completion of operations performed in describing another engine and/or module. For example, the control engine 314 of FIG. 3 can request, complete, or perform the methods and/or operations of the control engine 314 as well as the trust engine 304, the access engine 306, the procedure engine 308, and the restriction engine 310. The engines of system 300 can perform the example methods described in connection with FIGS. 5-7.

Figure 4:
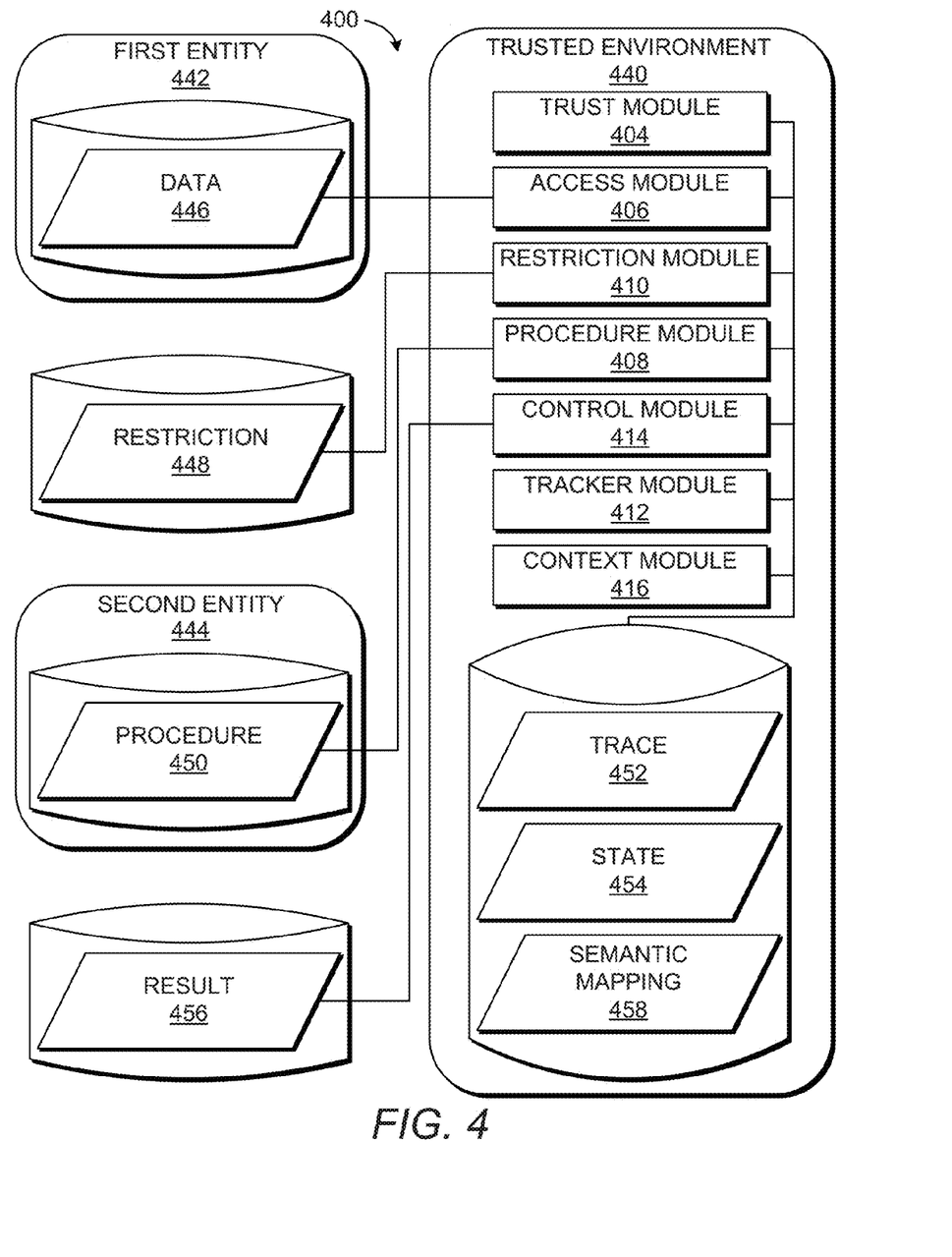
FIGS. 4 and 5 depict example modules used to implement example data sharing systems.
Figure 5:
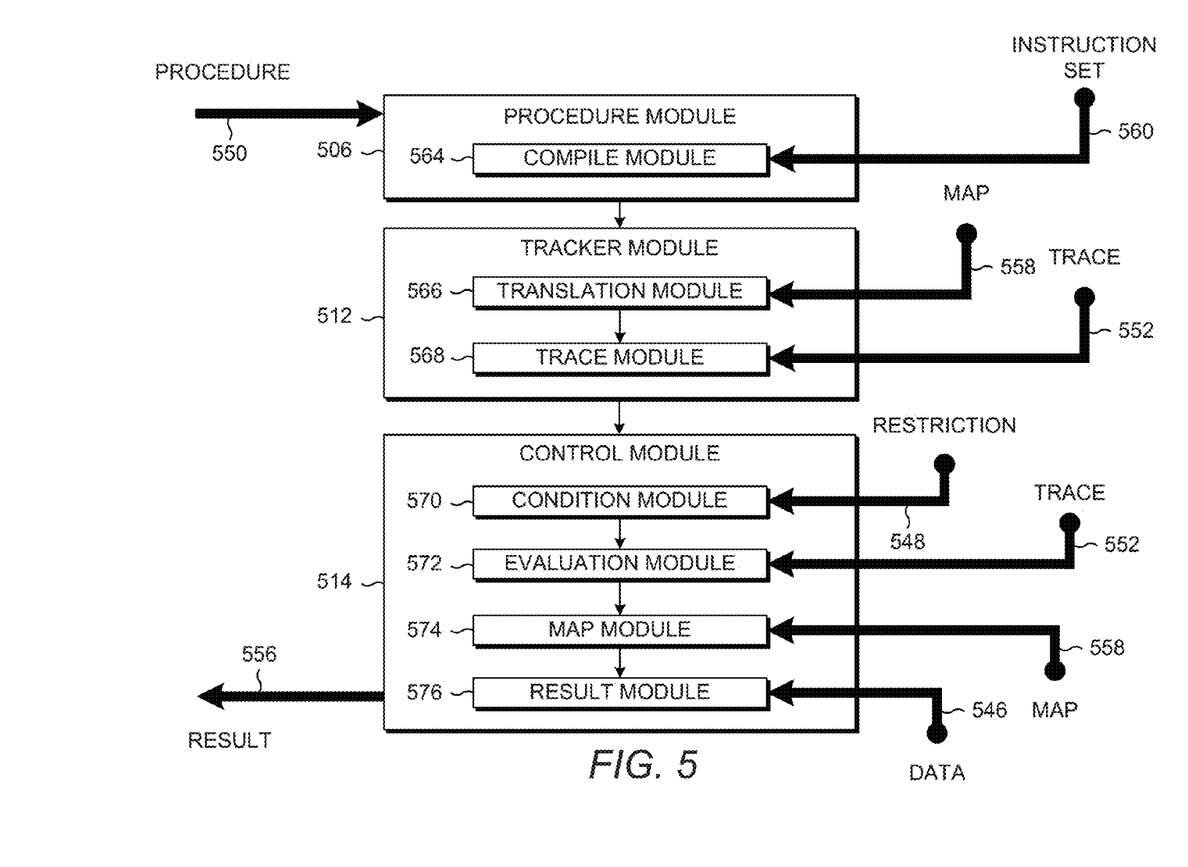

FIGS. 4 and 5 depict example modules used to implement example data sharing systems. Referring to FIG. 4, a trusted environment 440, such as a set of resources to execute a procedure based on a security policy, is shown as part of the system 400 for sharing data. The example system 400 of FIG. 4 generally includes a trust module 404, an access module 406, a procedure module 408, a restriction module 410, a tracker module 412, and a control module 414 that can be the same as the trust module 204, the access module 206, the procedure module 208, the restriction module 210, the tracker module 212, and the control module 214 of FIG. 2, respectively, and the associated descriptions are not repeated for brevity. The system 400 can include a context module 416 that represents program instructions that when executed function as the context engine 316 of FIG. 3 and the associated description is not repeated for brevity.

The trusted environment 440 is an environment that is sufficiently trusted by the entities of the transaction, such as a first entity 442 and a second entity 444. FIG. 4 depicts the trusted environment 440 as separate from the first entity 442 and the second entity 444. Other possible configurations include where the first entity 442 and the data 446 are within the trusted environment 440, the second entity 444 and the procedure 450 are within the trusted environment 440, and when the data 446 and the procedure 450, as well as the first entity 442 and the second entity 444, are within the trusted environment 440.

A first entity 442, such as a sharer, can own or otherwise manage a set of data 446 to be shared. A second entity 444, such as a sharee, can own or otherwise provide a procedure 450 to access the set of data 446. The trusted environment 440 can perform the data sharing transaction when the trust module 404 identifies that the trust level of each of entity of the transaction is met. For example, a third entity to receive the result 456 of the procedure 450 could provide a trust level to be satisfied by the trusted environment 440. Similarly, multiple entities could provide a trust level to be met. For example, the trust level could request a security protocol be used or could be a trust level of zero, such as where the second entity allows the procedure to be shared with anyone or the first entity allows unrestricted access to the data within the limits of the restriction 448.

The restriction 448 can be provided by the first entity 442, the second entity 444, or another entity or environment. Multiple restrictions, such as restriction 448, can be received by the environment. Similarly, the result 456 of the procedure 450 can be provided to the first entity 442, the second entity 444, or another entity or environment, and the result 456 can be provided to multiple entities and/or environments.

The tracker module 412 can track the procedure 450 to produce a trace 452. The information of the trace 452 can be translated by a semantic mapping 458 to a restriction 448. The control module 414 can be notified when the information of the trace 452 satisfies the restriction 448 and/or the procedure can be modified by a control mechanism to enforce the restriction 448.

The context module 416 can access the state 454 of the trusted environment 440, which may track the procedures executed in the trusted environment 440. The context of the trusted environment 440 can include the state 454 and the trace information 452. The control module 414 can maintain the execution of the procedure 450 and/or the result 456 based on the context. For example, the result 456 can be a partial view of the data 446 when the context satisfies the restriction 448. For another example, the result can be turned into a hash to hide a credit card number based on interception of the query with a hashing function. The environment 400 can store information to allow a future procedure to utilize data from a former procedure. For example, the context module 416 can access or otherwise provide an association for the state 454 or other information of the context to enable reverse translation, such as when a procedure has requested to use credit card information that has be obfuscated.

FIG. 5 depicts example modules used to implement example data sharing systems. The example modules of FIG. 5 generally include a procedure module 506, a tracker module 512, and a control module 514 that can be the same as the procedure module 408, the tracker module 412, and the control module 414 of FIG. 4. FIG. 5 depicts that the procedure module 506 can include a compile module 564; the tracker module 512 can include a translation module 566 and a trace module 568; and the control module 514 can include a condition module 570, an evaluation module 572, a map module 574, and a result module 576.

When a procedure 550 is received by the procedure module 506, the code of the procedure 550 can be modified to provide for secure execution to meet the level of trusts of the entities of the transaction. For example, the procedure 550 can be compiled with an instruction set 560 having an instruction to enforce a restriction 548. The compile module 564 represents program instructions that when executed function as a combination of circuitry and executable instructions to compile a procedure 550 based on an instruction set 560. For example as shown in FIG. 5, an instruction set 560 can be used to compile the procedure 550 in accordance with a security. The instruction set 560 can be based on a dictionary of semantic terms, such as map 558, to allow for restrictions, such as restriction 548, to be applied via the language of the definable environment.

During execution of the procedure 550, the procedure 550 can be tracked by the tracker module 512. The tracker module 512 can track the procedure 550 based on the restriction 548. The translation module 566 represents program instructions that when executed function as a combination of circuitry and executable instructions to translate the restriction 548 to identify what trace information 552 may trigger the restriction 548. For example, the translation module 566 can use a map 558 to make the identification. The trace module 568 represents program instructions that when executed function as a combination of circuitry and executable instructions to track the procedure 550 during execution and produce trace information 552. The trace information 552 can be produced in the language of the map 558 or otherwise mapable to the semantic terms of the restriction 548 applied on the environment and/or procedure.

The control module 514 can provide a result 556, such as a data view of a set of data 546, based on the restriction 548 and the trace 552. The condition module 570 represents program instructions that when executed function as a combination of circuitry and executable instructions to receive a restriction 548 and identify the condition to satisfy associated with the restriction 548. For example, the restriction 548 can be mapped to semantic terms associate with an encoding scheme for the result 556 based on the attributes of the data 546 accessed by the procedure 550.

The evaluation module 572 represents program instructions that when executed function as a combination of circuitry and executable instructions to identify when information of the trace 552 satisfies a condition of the restriction 548. The map module 574 represents program instructions that when executed function as a combination of circuitry and executable instructions to translate the information of the trace 552 based on the map 558. The evaluation module 572 and the map module 574 can work in conjunction to identify when the information of the trace 552 satisfies the restriction 548. For example, the evaluation module 572 can utilize the map module 574 to map the information of the trace 552 to semantic terms of a common ontology of security protocols. For example, when the information of the trace 552 maps to or otherwise satisfies the condition of a restriction 548, the control module 514 can maintain the procedure 550 to encode partial data or return a view associated with execution of the procedure 550 up to the time of execution when the condition was satisfied. The result 556 provided by the control module 514 can be determined by the result module 576.

The result module 576 represents program instructions that when executed function as a combination of circuitry and executable instructions to identify a data view of a set of data 546 based on the restriction 548 and the information of the trace 552. The result 556 returned by the control module 514 can be any appropriate view of the data 546 based on whether the trace 552 of the procedure satisfied the restriction 548. The view could be a full view of the data 546 or a partial view of the data 546.

Figure 6:
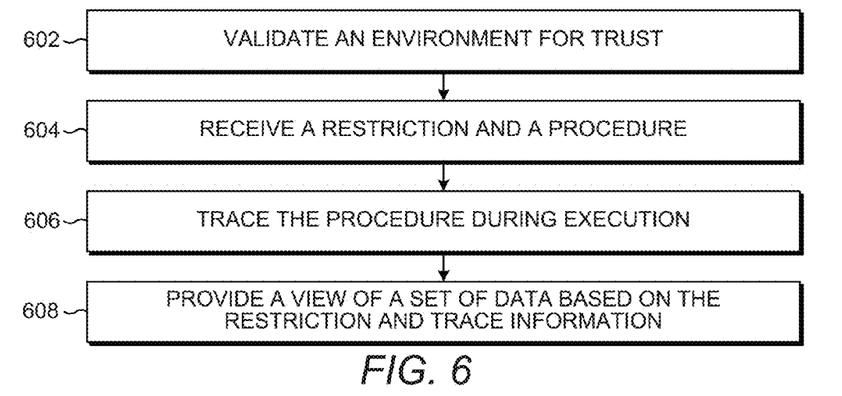
FIGS. 6 and 7 are flow diagrams depicting example methods for sharing a set of data.
Figure 7:
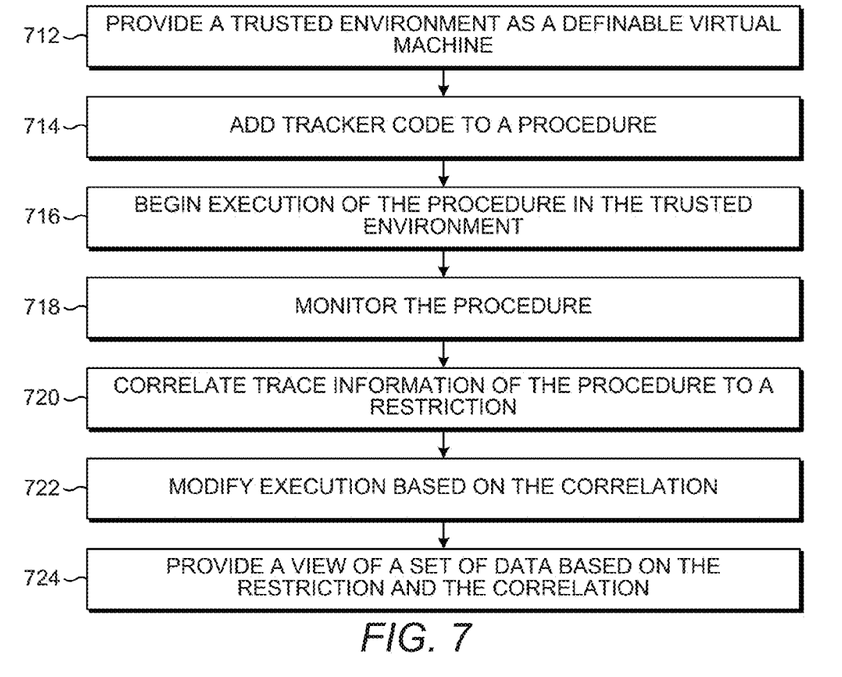

FIGS. 6 and 7 are flow diagrams depicting example methods for sharing a set of data. Referring to FIG. 6, example methods for sharing data generally comprise validating an environment for trust, receiving a restriction, receiving a procedure, tracing the procedure during execution, and providing a result based on the restriction and the trace information.

At block 602, an environment is validated for trust. An environment is validated for trust when it satisfies a level of trust of an entity. For example, an environment can be sufficiently trusted when it meets a level of trust between a first entity and a second entity.

At block 604, a restriction is received. A procedure is received at block 604 as well. The restriction is associated with a semantic term of the environment in which the procedure is to execute. The procedure can request access to a set of data when executed in the trusted environment. The procedure can be received from an entity separate from the owner of the data. For example, a procedure from a second entity can access a set of data of a first entity.

At block 606, the procedure is traced during execution. For example, a tracker engine can monitor the procedure and ascertain trace information as the procedure executes in the environment.

At block 608, a result of the procedure is provided based on the restriction and trace information. The result can be a view of the set of data accessed by the procedure. For example, the result can be a partial view of the data when the procedure satisfies the semantic condition of the restriction.

FIG. 7 depicts an example method for sharing a set of data that generally comprises providing a trusted environment as a definable virtual machine, adding tracker code to a procedure, beginning execution of the procedure in the trusted environment, monitoring the procedure, correlating trace information of the procedure to a restriction, modifying execution based on the correlation, and providing a view of a set of data based on the restriction and the correlation.

At block 712, a trusted environment is provided as a definable virtual machine. The definability of the virtual machine allows for the machine to understand high-level semantics to correlate code execution with knowledge of the data. For example, the environment can be instrumented at a semantic level capable of allowing natural language instructions and relationships. The environment can provide APIs to add a restriction (e.g. a business policy), a semantic mapping, and/or knowledge of the environment and/or data to the environment. For example, a set of security libraries can be provided via an API to utilize primitive instructions to protect the environment, the data, and/or the procedure based on a restriction. Instructions of the definable environment can verify the procedure for valid computations according the restrictions provided to the environment.

At block 714, tracker code is added to a procedure. The procedure can be modified for restriction via semantic tracking by at least one of adding code to the procedure to activate a control mechanism to enforce the restriction, such as instrumenting the code, and compiling the procedure to an instruction set based on the restriction. For example, a semantic term associated with the restriction can determine the instructions of the instructions set to compile the procedure to execute according to a security protocol of the trusted environment.

At block 716, execution of the procedure in the trusted environment begins. At block 718, the procedure is monitored as it executes. For example, a tracker engine can ascertain trace information associated with the procedure during execution.

At block 720, trace information of the procedure is correlated to a restriction. For example, the trace information can be compared to the restriction based on the semantic mapping. At block 722, execution of the procedure is modified based on the correlation. For example, execution could be modified by terminating the procedure based on the trace information and the restriction or spawning a process based on the limitation of the procedure from the restriction. A view of a set of data is provided based on the restriction and the correlation at block 724. The view of the set of data is produced based on a restriction and a semantic mapping defined into the environment. Thus, complex security protocols can be enforced while determining validity of computations to adhere to policy restrictions for security and data protection.

Although the flow diagrams of FIGS. 5-7 illustrate specific orders of execution, the order of execution may differ from that which is illustrated. For example, the order of execution of the blocks may be scrambled relative to the order shown. Also, the blocks shown in succession may be executed concurrently or with partial concurrence. All such variations are within the scope of the present invention.

The present description has been shown and described with reference to the foregoing examples. It is understood, however, that other forms, details, and examples may be made without departing from the spirit and scope of the invention that is defined in the following claims.

What is claimed is:

1. A data sharing system comprising:
   a processor; and
   a non-transitory computer readable medium storing instructions executable by the processor, the instructions comprising:
      instructions to identify an environment that satisfies a first level of trust of a first entity and a second level of trust of a second entity, wherein the first entity and the second entity are different devices;
      instructions to request access to a set of data associated with the first entity in response to a procedure received from the second entity;
      instructions to execute the procedure in the environment, the procedure to request access to the set of data in the environment to classify an instruction of the procedure based on a semantic mapping;
      instructions to receive a restriction from the first entity, wherein the restriction modifies the procedure that is executed in the environment, wherein the restriction mapable to a semantic term to limit information that can be accessed in the set of data by the procedure of the second entity;
      instructions to track the procedure during execution and produce trace information associated with the semantic mapping; and
      instructions to maintain execution of the procedure based on the semantic term associated with the restriction and the semantic mapping associated with the trace information.

2. The system of claim 1, wherein the restriction maps to one of a data structure, a data flow, and a communication pattern.

3. The system of claim 1, wherein the restriction and the procedure are correlated among a plurality of entities.

4. The system of claim 1, wherein the environment is to execute the procedure in a language having a control point, the tracker engine to retrieve trace information at the control point.

5. The system of claim 1, wherein the environment is to provide an instruction set that operates based on a semantic term associated with the restriction and the environment compiles the procedure based on the instruction set.

6. A non-transitory computer readable medium comprising a set of instructions executable by a processor resource to:
   identify an environment that satisfies a trust level, the trust level to represent an amount of trust of an entity for participation in a compute transaction and the environment definable by a language to provide a security protocol;
   receive a procedure from a user device to request access to a set of data associated with a service device;
   receive a restriction from the service device that modifies the procedure that is executed in the environment, wherein the restriction is to limit information that can be accessed in the set of data by the procedure of the second entity;
   compile the procedure based on an instruction set capable of semantically mapping the restriction to the procedure;
   map a set of trace information of the procedure to a semantic term; and
   provide a result of the procedure that is modified by the restriction and the semantic term.

7. The medium of claim 6, wherein the set of instructions is executable by the processor resource to:
   add an instruction to the instruction set based on a user-provided semantic mapping.

8. The medium of claim 6, wherein the set of instructions is executable by the processor resource to at least one of:
   spawn a process based on the restriction and the semantic term; and
   terminate execution of the procedure when the trace information satisfies the restriction.

9. The medium of claim 6, wherein the set of data resides in a first compute environment and the procedure is received from a second compute environment.

10. The medium of claim 9, wherein the environment includes at least one of the first compute environment and the second compute environment.

11. A method for sharing a set of data comprising:
    validating, by a processor, an environment satisfies a level of trust between a first entity and a second entity, wherein the first entity and the second entity are different devices;
    receiving, by the processor, a semantic restriction associated with a semantic term of the environment from the first entity;
    receiving, by the processor, a procedure from the second entity, wherein the procedure is to access the set of data of the first entity, wherein the procedure is modified by the semantic restriction to limit information that can be accessed in the set of data by the procedure of the second entity;
    tracing, by the processor, the procedure during execution; and
    providing, by the processor, a view of the set of data based on the procedure that is modified by the semantic restriction and a semantic mapping of trace information that is executed in the environment.

12. The method of claim 11, comprising at least one of:
    adding code to the procedure to activate a control mechanism to enforce the restriction; and
    compiling the procedure to an instruction set based on the restriction.

13. The method of claim 11, comprising:
    comparing the trace information to the restriction based on the semantic mapping.

14. The method of claim 11, comprising:
    spawning a process based on a limitation of the procedure from the restriction.

15. The method of claim 11, comprising:
    terminating the procedure based on the trace information and the restriction.

16. The system of claim 1, wherein the first level of trust comprises a level of encryption of the set of data.

17. The system of claim 1, wherein the instructions to identify an environment comprises instructions to apply trust controls on the second entity.

18. The system of claim 1, wherein the instructions further comprise:
    instructions to maintain a context of the environment associated with the procedure.

19. The system of claim 18, wherein the context comprises a semantic identifier of the environment associated with the execution of the procedure.

20. The system of claim 18, wherein the instructions to maintain the context comprises instructions to ensure that the restriction is applied correctly.

* * * * *